Patented Jan. 14, 1947

2,414,193

UNITED STATES PATENT OFFICE 2,414,193

2,2 - BIS(p-CHLOROPHENYL) - 1,1,1 - TRICHLORETHANE AND SULFUR INSECTICIDE

Wallace Durham, San Marino, Calif., assignor to Stauffer Chemical Company, a corporation of California No Drawing. Application July 3, 1944, Serial No. 543,410

3 Claims. (Cl. 167—20)

This invention relates to improvements in insecticidal compositions. The insecticidal utility of compounds of the formula, 2,2-bis(p-chlorophenyl)-1,1,1-trichlorethane has been disclosed in Patent 2,329,074 and its reissue, 22,700. Usually this material has been utilized in conjunction with various inert carriers.

I have found that the aforementioned trichlorethane compound can be advantageously applied in dust form in conjunction with finely divided dusting sulphur with increased effectiveness. For example, it has been determined that application of a finely divided dusting sulphur containing 2% of the aforementioned trichlorethane compound gave a more complete control when applied on citrus trees for the control of citrus thrip than did other dusts containing like amounts of this compound in the usual carriers employed heretofore. In fact, the total control secured was more effective than that secured (1) with a dust containing as much as 3% of the same trichlorethane compound in a finely divided clay, and (2) a typical dusting sulphur applied under suitable conditions.

In making up the composition, the trichlorethane compound and the sulphur can be mixed together mechanically or the trichlorethane compound can be added and ground with the sulphur in a mill. If desired, one of the usual sulphur conditioners can be included, as is well known in the art. The usual sulphur conditioners are inert and have no effect, in and of themselves, on insects. One can refer to the Pough Patent 1,629,528, to the Wieder Patent 1,908,619, to the Missbach Patent 2,156,790, to the first addition (No. 3,632) to French Patent 320,627 and to Bourcart, Insecticides, Fungicides & Weed Killers, page 48 (Benn, London, 1926) for typical insecticidal compositions including sulphur and various conditioners and wherein the sulphur contributes from 10% to 99% of the composition. The quantity of the trichlorethane compound of the aforementioned patents to be included should generally not be in excess of 15%, varying from this quantity to as little as 0.5%. Generally between 2% and 5% of the trichlorethane compound is effective to give an increased control.

The disclosure of each of the aforementioned patents is incorporated by reference insofar as this is necessary to inform those skilled in the art as to the manufacture and chemical identity of the materials.

I claim:

1. An insecticide containing, as an essential active ingredient, a composition consisting essentially of 2,2-bis(p-chlorophenyl)-1,1,1-trichlorethane and sulphur, the 2,2-bis(p-chlorophenyl)-1,1,1-trichlorethane being present in from about 0.5% to about 15% of the weight of the composition, the sulphur constituting substantially the balance of the composition.

2. An insecticide containing, as an essential active ingredient, a composition consisting essentially of 2,2-bis(p-chlorophenyl)-1,1,1-trichlorethane and sulphur, the 2,2-bis(p-chlorophenyl)-1,1,1-trichlorethane being present in from about 2% to about 5% of the weight of the composition, the sulphur constituting substantially the balance of the composition.

3. A finely divided dusting composition containing from about 0.5% to about 15% by weight of 2,2-bis(p-chlorophenyl)-1,1,1-trichlorethane and the balance substantially sulphur.

WALLACE DURHAM.